(12) United States Patent
Ishimori

(10) Patent No.: US 10,150,309 B2
(45) Date of Patent: Dec. 11, 2018

(54) PRINTING DEVICE

(71) Applicant: SEIKO EPSON CORPORATION, Tokyo (JP)

(72) Inventor: Hiroyuki Ishimori, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/541,649

(22) PCT Filed: Dec. 22, 2015

(86) PCT No.: PCT/JP2015/006414
§ 371 (c)(1),
(2) Date: Jul. 5, 2017

(87) PCT Pub. No.: WO2016/110921
PCT Pub. Date: Jul. 14, 2016

(65) Prior Publication Data
US 2018/0015743 A1    Jan. 18, 2018

(30) Foreign Application Priority Data
Jan. 6, 2015    (JP) .................................. 2015-000679

(51) Int. Cl.
*B41J 3/36*    (2006.01)
*B41J 11/70*    (2006.01)
(Continued)

(52) U.S. Cl.
CPC ................. *B41J 11/70* (2013.01); *B41J 3/36* (2013.01); *B41J 15/04* (2013.01); *B41J 29/00* (2013.01);
(Continued)

(58) Field of Classification Search
CPC ..... B41J 3/36; B41J 15/04; B41J 29/00; B41J 29/13; B41J 29/38
See application file for complete search history.

(56) References Cited

U.S. PATENT DOCUMENTS 5,820,068 A    10/1998   Hosomi et al.
5,884,861 A    3/1999   Hosomi et al.
(Continued)

FOREIGN PATENT DOCUMENTS

EP    1 086 821 A2    3/2001
EP    1 270 242 A2    1/2003
(Continued)

OTHER PUBLICATIONS

International Search Report dated Mar. 15, 2016 in PCT/JP2015/006414 with English-language translation (9 pgs.).
(Continued)

*Primary Examiner* — Lamson Nguyen
(74) *Attorney, Agent, or Firm* — Foley & Lardner LLP

(57) ABSTRACT

A NFC communication unit 10 for communication by contactless near-field communication is disposed to a third side 23 of the printer case 2. The roll paper printer 1 can be used in a first orientation 1A in which the third side 23 (first surface) where the NFC communication unit 10 is located is at the front, and in a second orientation 1B in which the third side 23 is at the top. The NFC communication unit 10 is disposed to a corner where the third side 23 (first surface) and the first side 21 (second surface) connect. A display unit 9 and recording paper exit 3 are also disposed at this corner.

17 Claims, 6 Drawing Sheets

(51) Int. Cl.

| | | |
|---|---|---|
| *B41J 15/04* | (2006.01) | |
| *B41J 29/00* | (2006.01) | |
| *B41J 29/13* | (2006.01) | |
| *B41J 29/38* | (2006.01) | |
| *G06F 3/12* | (2006.01) | |
| *G06K 15/00* | (2006.01) | |
| *G06K 15/02* | (2006.01) | |
| *H04B 5/00* | (2006.01) | |

(52) U.S. Cl.
CPC .............. *B41J 29/13* (2013.01); *B41J 29/38* (2013.01); *G06F 3/1236* (2013.01); *G06F 3/1292* (2013.01); *G06K 15/404* (2013.01); *G06K 15/4065* (2013.01); *G06K 15/022* (2013.01); *H04B 5/0025* (2013.01)

(56) References Cited

U.S. PATENT DOCUMENTS

| | | |
|---|---|---|
| 9,180,696 B2 | 11/2015 | Togo et al. |
| 9,244,645 B2 | 1/2016 | Iwanaga |
| 2001/0017713 A1 | 8/2001 | Shinohara |
| 2002/0121566 A1 | 9/2002 | Fiutak et al. |
| 2011/0097131 A1 | 4/2011 | Ishida |
| 2011/0268488 A1 | 11/2011 | Inoue |
| 2012/0224201 A1 | 9/2012 | Asahina |
| 2013/0286433 A1 | 10/2013 | Matsushima et al. |
| 2015/0002605 A1 | 1/2015 | Aizawa et al. |

FOREIGN PATENT DOCUMENTS

| | | |
|---|---|---|
| EP | 1 749 623 A1 | 2/2007 |
| EP | 2 682 271 A2 | 1/2014 |
| JP | H06-233018 | 8/1994 |
| JP | H09-295436 A | 11/1997 |
| JP | 2001-315403 A | 11/2001 |
| JP | 2005-088350 A | 4/2005 |
| JP | 2005-349746 A | 12/2005 |
| JP | 2010-201703 A | 9/2010 |
| JP | 2012-179861 A | 9/2012 |
| JP | 2014-004687 A | 1/2014 |
| JP | 2014-014943 A | 1/2014 |
| JP | 2014-065316 A | 4/2014 |

OTHER PUBLICATIONS

Extended European Search Report dated Mar. 9, 2018 in related European Appl. No. 15876800.2 (11 pgs.).

(a)

(b)

PRINTING DEVICE

TECHNICAL FIELD

The present invention relates to a printing device that can be used in multiple orientations, including vertically and horizontally.

BACKGROUND

Roll paper printers and other types of printing devices that hold a roll of continuous recording paper in a roll paper holder, and print to the recording paper pulled from the paper roll are known from the literature. Due to limited space where the printing device is used, for example, some printing devices of this type are configured so that they can be used in either of two orientations, vertically or horizontally. For example, the roll paper printer (printing device) described in PTL 1 can be placed in a horizontal orientation on a horizontal surface, or mounted vertically on a wall. When mounted on a wall, the surface that is the back when placed horizontally is on the bottom facing down. PTL 2 describes a facsimile machine (printing device) that can used either vertically or horizontally.

The locations of the parts of the printing device and the operating direction relative to the user change depending on the orientation (placement) of a printing device that can be used vertically or horizontally. The locations of the parts of the printing device and the operating direction also change relative to the vertical axis. This can adversely affect ease of use. Where the paper roll is held inside the printing device and the conveyance path may also change, resulting in problems with supplying the recording paper and detecting the recording paper. To accommodate the location where the paper roll is held changing, the roll paper printer described in PTL 1 has recesses for holding the roll paper at two locations in the roll paper holder. The printer also has two locations for installing a detector for detecting the roll paper, and the location of the detector can be changed according to the orientation of the printer. Because the orientation of the display unit reverses relative to the user when the orientation of the facsimile machine changes, the facsimile machine described in PTL 2 enables control reversing the orientation of the content displayed on the display unit, or reversing the orientation in which the display unit is installed.

CITATION LIST

Patent Literature

[PTL 1] JP-A-H9-295436
[PTL 2] JP-A-H6-233018

SUMMARY OF INVENTION

Technical Problem

Providing a contactless communication device for contactlessly reading information from a mobile terminal held by the user, for example, as a means of inputting information to the printing device is also desirable. However, when the printing device is equipped with such a contactless communication device, the location of the communication unit may become farther from the user when the orientation of the printer changes, and ease of use may deteriorate. There are also configurations other than the contactless communication device that become more difficult to use when the printer orientation changes, and similar problems thus occur with the locations of the paper exit from which the recording paper is discharged, the display unit, and the access cover that opens and closes the opening for loading the roll paper.

To resolve problems resulting from changing the orientation, PTL 1 and 2 have configurations such as multiple recesses for holding the paper roll, two locations where a detector can be installed, and means of changing the orientation of the display unit. However, a problem with adding configurations to accommodate changing the device orientation is that the device becomes larger.

With consideration for the foregoing problem, an objective of the present invention is to provide a printing device that can maintain ease of use even when the installed orientation changes and is beneficial for reducing device size.

Solution to Problem

To solve the foregoing problem, the invention is characterized by: a printhead that prints on recording paper; a contactless communication unit that communicates by contactless near-field communication; and a case that houses the printhead and the contactless communication unit; the case having a first surface where the contactless communication unit is disposed, and a second surface that connects to the first surface and has a recording paper exit from which the recording paper is discharged; the printing device being usable in a first orientation in which the second surface is the top, and a second orientation in which the second surface is the front.

The invention thus has a contactless communication unit for contactless near-field communication, and can be placed in a first orientation in which the second surface to which the contactless communication unit is disposed is at the top, or a second orientation in which the second surface is at the front. Therefore, whether placed in the first orientation or the second orientation, the contactless communication unit can be placed at a position easily accessible to the user. There is also no need to provide a second contactless communication unit, or a means of changing the location of the contactless communication unit, in order to assure ease of use. This is beneficial for achieving a small size.

In the invention, the contactless communication unit is preferably disposed at a corner where the first surface and the second surface meet. Thus comprised, because the contactless communication unit is disposed to the corner where the front and top connect, there is substantially no change in the location of the contactless communication unit even if the orientation is changed. Ease of use therefore does not change. Furthermore, placing the contactless communication unit at the corner of the top and the front is convenient for near-field communication with a terminal held by the user.

In the invention, an indication of the place where the contactless communication unit is located is preferably provided on the first surface or the second surface. Thus comprised, the user can know by looking where to hold the external terminal device near. User convenience is therefore excellent.

The invention preferably also has a circuit board configuring a control unit that controls the printhead based on information acquired by the contactless communication unit, and the circuit board is disposed along the first surface. Thus comprised, the space between the case and the print mechanism unit including the print mechanism, conveyance mechanism, and roll paper compartment can be used to locate the circuit board. This uses space efficiently and helps making the printing device small. Connecting the contactless communication unit and circuit board is also easy because the contactless communication unit and circuit board are close together.

The invention preferably also has a water resistant member covering the circuit board on the recording paper exit side. Thus comprised, problems resulting from the liquid contacting the circuit board can be avoided even if water or other liquid enters from the recording paper exit.

Further preferably in this configuration, a sheet metal member is disposed along the circuit board, and the sheet metal member is separated at least a specific distance from the contactless communication unit. Thus comprised, if static electricity is produced near the circuit board, the static electricity can be drained by the sheet metal member. Static electricity can also be prevented from creating problems in control elements on the circuit board. Furthermore, by separating the sheet metal member from the contactless communication unit, interference by the sheet metal member with stable near-field communication when an external terminal device is held near the contactless communication unit can also be avoided.

Further preferably, the invention has either or both a display unit disposed at a corner where the first surface and the second surface connect; and an access cover disposed to the first surface or the second surface. Thus comprised, the display unit and access cover, and not only the contactless communication unit, can be located at a position easily accessible to the user regardless of the orientation of the printing device.

Preferably, the invention also has a conveyance mechanism that conveys the recording paper, and a conveyance motor that drives the conveyance mechanism; a cutter mechanism that cuts the recording paper, and a cutter motor that drives the cutter mechanism; and a roll paper holder in which a paper roll of the recording paper wound into a roll is held; and the conveyance motor and the cutter motor are disposed on the same side of the roll paper holder. For example, when the direction in which the paper roll in the roll paper holder rolls is the direction of rotation, the conveyance motor and the cutter motor are preferably located on the same side of the roll paper holder in the direction perpendicular to the direction of rotation. Thus comprised, drive units such as the conveyance motor and cutter motor can be concentrated in the space left after disposing the roll paper holder inside the printer case. A space-efficient arrangement therefore be achieved, and the printing mechanism unit can be compactly configured. This also helps achieve a small device. Furthermore, if drive units such as the conveyance motor and cutter motor are concentrated in the space that is long in the direction of rotation created on the side of the width of the roll paper holder, an arrangement that uses space efficiently when the printer is shaped like a cube can be achieved.

The invention preferably also has a device-side connector to which an external connector connected to an external cable can connect; the case has a connector housing that can house the external connector; and the device-side connector is disposed facing the connector housing. This configuration can house all external connectors connected to the device-side connectors inside the case. Space for placing a connection unit for the connectors is not needed outside the case, and the appearance is better when installed. Problems resulting from accidentally touching the connections between the external connectors and device-side connectors can also be avoided.

DESCRIPTION OF EMBODIMENTS

A preferred embodiment of a roll paper printer according to the invention is described below with reference to the accompanying figures.

General Configuration

Figure 1:
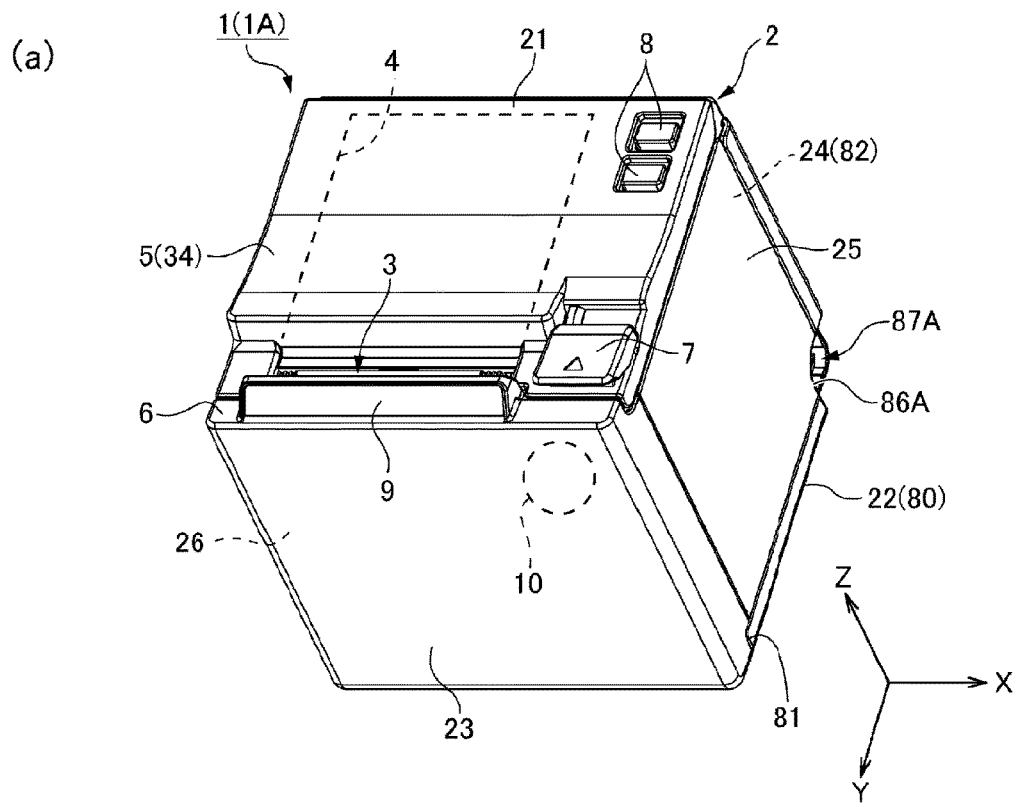
FIG. 1 is an external oblique view of a roll paper printer according to the invention, and an oblique view of the roll paper printer with the printer case removed (in a first orientation).
Figure 1:
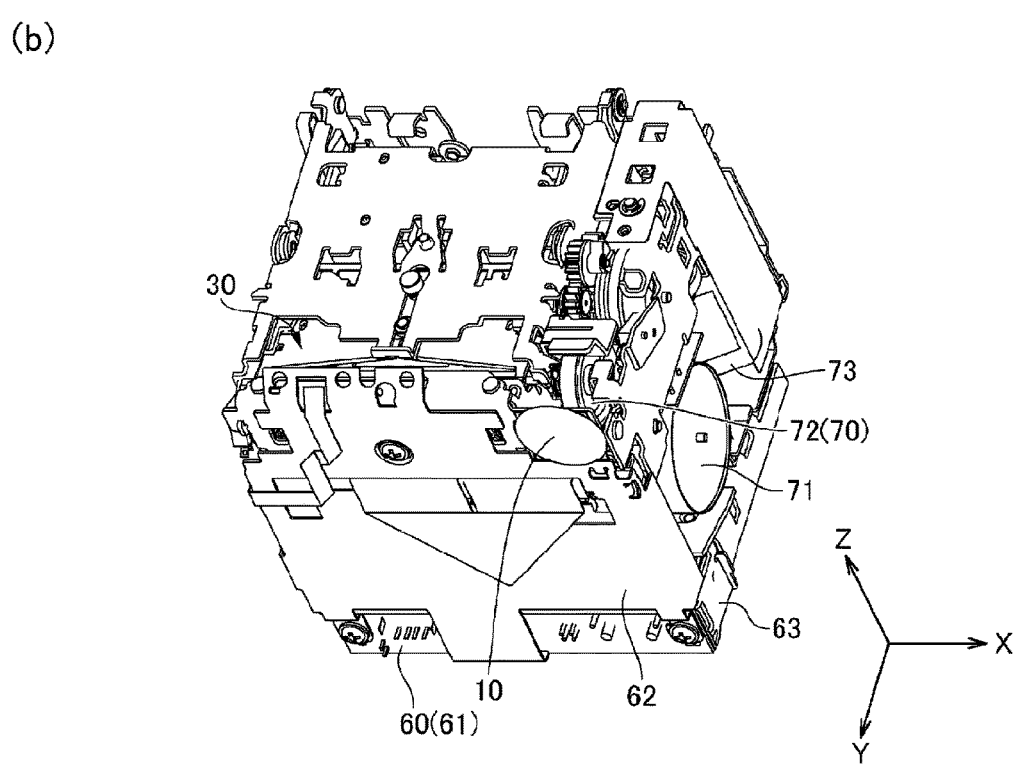
Figure 2:
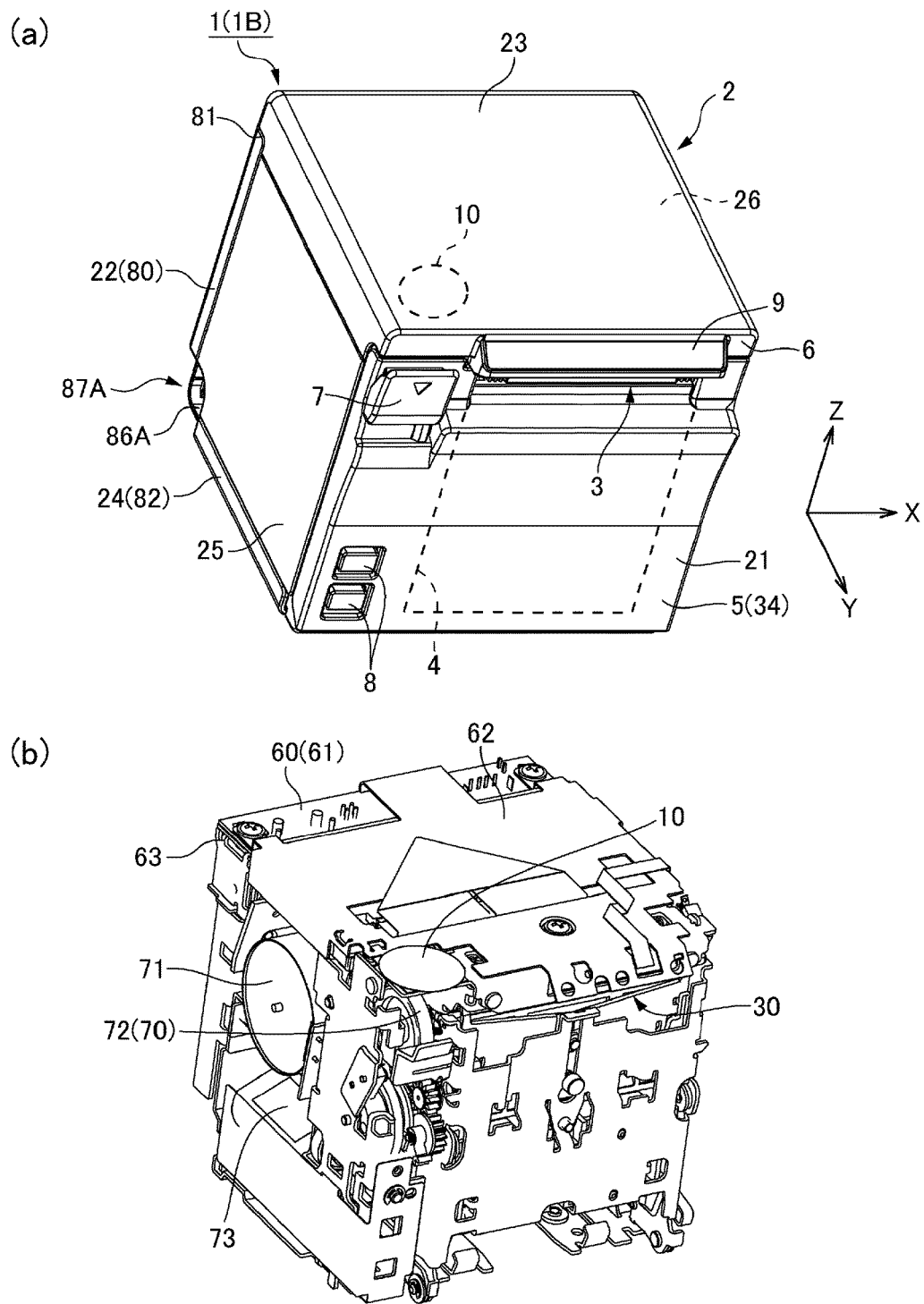
FIG. 2 is an external oblique view of a roll paper printer according to the invention, and an oblique view of the roll paper printer with the printer case removed (in a second orientation).

FIG. 1 and FIG. 2 have external oblique views showing a roll paper printer according to this embodiment of the invention, and oblique views of the printer with the printer case removed, FIG. 1 (a) and FIG. 2 (a) being external oblique views, and FIG. 1 (b) and FIG. 2 (b) showing the printer with the printer case removed. The invention is described below with reference to three mutually perpendicular axes, the X-axis, Y-axis, and Z-axis. The arrows of the three XYZ axes in FIG. 1 and FIG. 2 point in the forward (positive) direction, and the direction opposite the direction in which the arrows point is the reverse (negative) direction. When in use, the roll paper printer 1 (printing device) is placed on the XY side, which is a horizontal surface. The roll paper printer 1 holds a paper roll 12 (see FIG. 3, FIG. 4) of continuous recording paper 11 (see FIG. 3, FIG. 4) wound into a roll, and prints to the recording paper 11 delivered from the paper roll 12.

The roll paper printer 1 has a generally box-shaped printer case 2. The printer case 2 has a first side 21 (second surface) in which the recording paper exit 3 is formed. In the orientation shown in FIG. 1 (a), the first side 21 faces up (+Z-axis), and the recording paper exit 3 is located at the front edge (+Y-axis side) of the first side 21. This orientation in which the recording paper exit 3 is located at the top front edge (the front side when seen by the user) of the printer case 2 is referred to as the first orientation 1A of the roll paper printer 1. The printer case 2 has a second side 22 forming the bottom (−Z-axis side) in the first orientation 1A; a third side 23 (first surface) forming the front (+Y-axis side) in the first orientation 1A; a fourth side 24 forming the back (−Y-axis side) in the first orientation 1A; a fifth side 25 forming one side of the width (+X-axis side) in the first orientation 1A; and a sixth side 26 forming the other side of the width (−X-axis side) in the first orientation 1A.

When placed as shown in FIG. 2 (a), the first side 21 of the roll paper printer 1 faces the front (+Y-axis), and the recording paper exit 3 is at the front of the roll paper printer 1. This orientation is referred to as the second orientation 1B of the roll paper printer 1. In the second orientation 1B, the second side 22 is the back (−Y-axis side), the third side 23 is the top (+Z-axis side), and the fourth side 24 is the bottom (−Z-axis side). As in the first orientation 1A, the fifth side 25 and sixth side 26 form one side (+X-axis side) of the width and the other side (−X-axis side) of the width.

The configuration of the first side 21 (second surface) and the third side 23 (first surface) of the roll paper printer 1 are described below assuming the roll paper printer 1 is placed in the first orientation 1A shown in FIG. 1 (a).

A rectangular roll paper loading opening 4 for loading and removing the paper roll 12 is formed in the first side 21 of the printer case 2. The first side 21 also includes an access cover 5 that closes the roll paper loading opening 4, and a front end part 6 extending along the +Y-axis edge of the roll paper loading opening 4. The access cover 5 can pivot on the back end (−Y-axis end) thereof and move between the closed position 5A shown in FIG. 3, and the open position 5B (see FIG. 4) standing vertically (+Z-axis). When the access cover 5 is in the closed position 5A, the recording paper exit 3 is formed as a slot on the X-axis between the access cover 5 and the front end part 6. The access cover 5 also has an operating lever 7 located on one side (+X-axis side) of the width of the recording paper exit 3. A lock not shown is disengaged by pulling up on the operating lever 7. As a result, the access cover 5 can open upward.

An operating unit 8 including a power switch is disposed at the back (−Y-axis side) corner of the access cover 5. The front end part 6 of the first side 21 has an incline that slopes diagonally up to the front (sloping in the +Y-axis and +Z-axis directions), and a display unit 9 is disposed to this incline. The display unit 9 displays information such as the operating state of the roll paper printer 1. The display unit 9 extends along the top edge part of the third side 23 where the third side 23 meets the first side 21. A NFC communication unit 10 (contactless communication unit) is disposed on the top edge part of the third side 23 on one side of the width (+X-axis side). The NFC communication unit 10 is a unit that reads information by contactless near-field communication from an NFC chip in a mobile terminal held by the user, for example, and can communicate by near-field communication conforming to the NFC (Near Field Communication) standard. The roll paper printer 1 can print based on information acquired by contactless near-field communication through the NFC communication unit 10.

When the roll paper printer 1 is placed in the first orientation 1A shown in FIG. 1 (a), the recording paper exit 3, display unit 9, and NFC communication unit 10 are all concentrated at the corner where the device top (first side 21) and the device front (third side 23) meet. In other words, the recording paper exit 3, display unit 9, and NFC communication unit 10 are all concentrated at a position that is easily accessible at the front facing the user. When placed in the second orientation 1B shown in FIG. 2 (a), The recording paper exit 3, display unit 9, and NFC communication unit 10 are all concentrated at the corner where the device top (third side 23) and the device front (first side 21) meet. The first orientation 1A shown in FIG. 1 (a) is the orientation in which the first side 21 of the recording paper exit 3 is at the device top, and the printed recording paper 11 can be discharged up (+Z-axis) from the device top. The second orientation 1B shown in FIG. 2 (a) is the orientation in which the first side 21 of the recording paper exit 3 is at the device front, and the printed recording paper 11 can be discharged to the front (+Y-axis) from the device front. The roll paper printer 1 can thus be set according to the location so that the recording paper 11 is discharged in either of two directions, up or to the front. The roll paper printer 1 is also configured so that convenience of operation is not impaired in either orientation.

As shown in FIG. 1 (b) and FIG. 2 (b), the NFC communication unit 10 is disposed with the round antenna surface facing the same direction as the third side 23. In FIG. 1 (a) and FIG. 2 (a), the area in the third side 23 where the NFC communication unit 10 is located is indicated by a dotted line, and a marking indicating where the NFC communication unit 10 for contactless near-field communication with an external terminal device is located is preferably presented on the third side 23. For example, an image or lettering indicating that the NFC communication unit 10 is located in that position is preferably displayed. Alternatively, that the external terminal device should be placed near this position for contactless communication is preferably indicated. Such indications may also be displayed on the first side 21.

In the first orientation 1A shown in FIG. 1 (a), the access cover 5 opens to the top (+Z-axis side) by pivoting on the back end thereof at the top of the roll paper printer 1, thereby opening the roll paper loading opening 4 to the top. The paper roll 12 can therefore be replaced by removing the paper roll 12 from the top and dropping a paper roll 12 in from the top. In the second orientation 1B shown in FIG. 2 (a), the access cover 5 opens to the front (+Y-axis side) pivoting on the bottom end thereof at the front of the roll paper printer 1. The roll paper loading opening 4 therefore opens to the front. The paper roll 12 is replaced by removing the paper roll 12 from the front and loading a paper roll 12 from the front. The paper roll 12 can therefore be easily replaced in both orientations of the roll paper printer 1.

Internal Configuration

Figure 3:
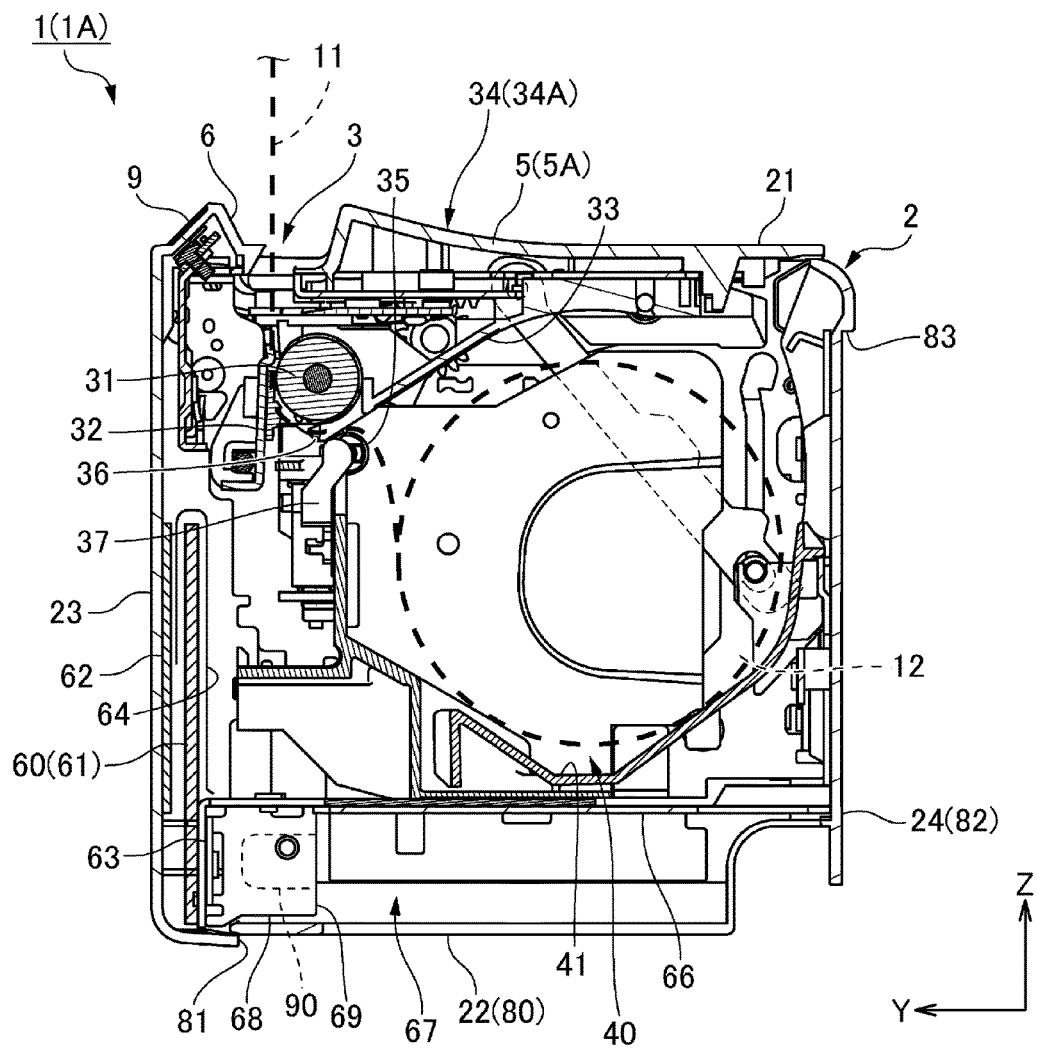
FIG. 3 is a vertical section view showing the internal configuration of the roll paper printer (with the access cover closed).
Figure 4:
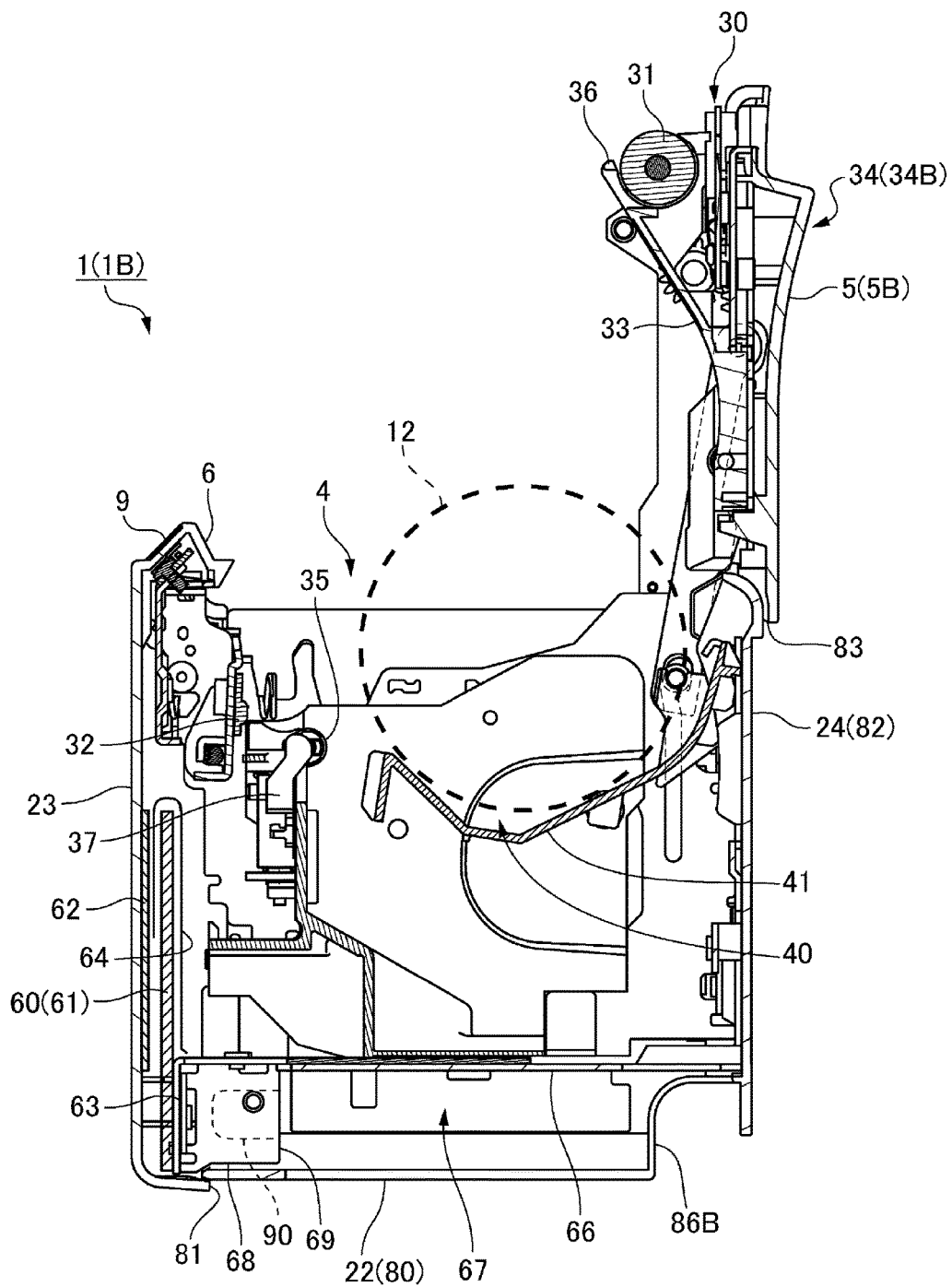
FIG. 4 is a vertical section view showing the internal configuration of the roll paper printer (with the access cover open).

FIG. 3 and FIG. 4 are vertical section views illustrating the internal configuration of the roll paper printer 1. FIG. 3 shows the access cover 5 closed, and FIG. 4 shows the access cover 5 open. FIG. 3 and FIG. 4 also show the roll paper printer 1 in the first orientation 1A. The internal configuration of the roll paper printer 1 is described below when in the first orientation 1A based on FIG. 3 and FIG. 4. A cutter mechanism 30 for cutting the recording paper 11 is disposed inside the printer case 2 near the recording paper exit 3. Below the cutter mechanism 30 are a platen roller 31 (conveyance roller) and printhead 32. The platen roller 31 is mounted on a platen support frame 33 that supports the access cover 5 from the back side (−Z-axis side). The access cover 5, cutter mechanism 30, and platen roller 31 mechanisms embody an access cover unit 34 that opens and closes in unison with the platen support frame 33. As shown in FIG. 3, when the access cover unit 34 is in the closed position 34A, the access cover 5 is in the closed position 5A. As shown in FIG. 4, when the access cover unit 34 is in the open position 34B, the access cover 5 is in the open position 5B.

A roll paper compartment 40 is located below the access cover unit 34. The roll paper compartment 40 has a roll paper holder 41 that holds a paper roll 12. The middle of the roll paper holder 41 on the Y-axis is recessed to the −Z-axis side, and faces the roll paper loading opening 4 formed in the first side 21. When the access cover unit 34 opens as shown in FIG. 4, the paper roll 12 can be removed and loaded to the roll paper holder 41 from the roll paper loading opening 4. The loaded paper roll 12 is held resting movably on the bottom of the roll paper holder 41.

As shown in FIG. 3 and FIG. 4, when in the first orientation 1A, the front end (+Y-axis end) of the roll paper holder 41 rises vertically (+Z-axis), and a delivery roller 35, which is a follower roller, is located near the top. The recording paper 11 delivered from the paper roll 12 is set passing over the delivery roller 35, along a paper guide 36 located at the bottom end of the platen support frame 33, and between the platen roller 31 and printhead 32. The recording paper 11 is conveyed by the conveyance force of the platen roller 31, passes between the fixed knife and movable knife of the cutter mechanism 30, and is discharged from the recording paper exit 3 to the top of the printer case 2. Because the paper guide 36 protrudes at a downward angle, the conveyance path passing the delivery roller 35 and paper guide 36 curves in an upwardly convex shape. A paper detection lever 37 is disposed to this curved path. The paper detection lever 37 contacts the bottom (the inside of the curve) of recording paper 11 conveyed up through the curve, and detects the recording paper 11.

Circuit Board Location

The roll paper printer 1 has a circuit board 60 disposed to the back side (inside) of the third side 23 of the printer case 2. Various control elements are mounted on this circuit board 60. A controller 61 that controls parts of the roll paper printer 1 is embodied by the control elements and circuits on the circuit board 60. One end of the circuit board 60 extends to near the corner between the third side 23 and second side 22. The other end of the circuit board 60 extends to a position removed a specific distance from the corner between the third side 23 and first side 21, and the NFC communication unit 10 is disposed between this other end of the circuit board 60 and the corner between the third side 23 and first side 21. The controller 61 can acquire information by contactless near-field communication from an external terminal device through the NFC communication unit 10.

The circuit board 60 is covered by a sheet metal panel 62 between the circuit board 60 and the third side 23 of the printer case 2. The circuit board 60 is also affixed to a sheet metal frame 63 disposed to the opposite side as the sheet metal panel 62. The sheet metal panel 62 and frame 63 allow static electricity to drain when a static charge is produced near the circuit board 60. Failures and faults in the control elements and circuits on the circuit board 60 caused by static electricity can therefore be avoided.

The sheet metal panel 62 and frame 63 are preferably located so there is no interference with contactless communication by the NFC communication unit 10. More specifically, so that the magnetic field produced by the NFC communication unit 10 does not produce induction current in the sheet metal panel 62 and frame 63 that will then cancel and weaken the magnetic field produced by the NFC communication unit 10, the sheet metal panel 62 and frame 63 are preferably disposed at positions where there is no intersection with the magnetic field produced by the NFC communication unit 10. More specifically, the sheet metal panel 62 and frame 63 are preferably located at least a specific distance away from the NFC communication unit 10.

As shown in FIG. 3 and FIG. 4, the circuit board 60 is also covered by a water resistant sheet 64 (water resistant member) on the same side as the frame 63. The water resistant sheet 64 is draped over the NFC communication unit 10 side edge of the circuit board 60 with one side of the water resistant sheet 64 completely covering the frame 63 side surface of the circuit board 60, and the other end side covering the circuit board 60 so that part of the sheet metal panel 62 side of the circuit board 60 is covered. The cutter mechanism 30 is on the same side of the circuit board 60 as the NFC communication unit 10. The cutter mechanism 30 is located on the back side of the recording paper exit 3 formed in the first side 21. Therefore, if water or other liquid enters from the recording paper exit 3 and the liquid passes between the fixed knife and movable knife of the cutter mechanism 30 and reaches the circuit board 60 side, the liquid can be prevented from contacting the control elements and circuits on the circuit board 60. Failure and faults in the control elements and circuits on the circuit board 60 due to contact with liquid can therefore be prevented.

Location of the Roll Paper Holder and Drive Mechanism

Figure 5:
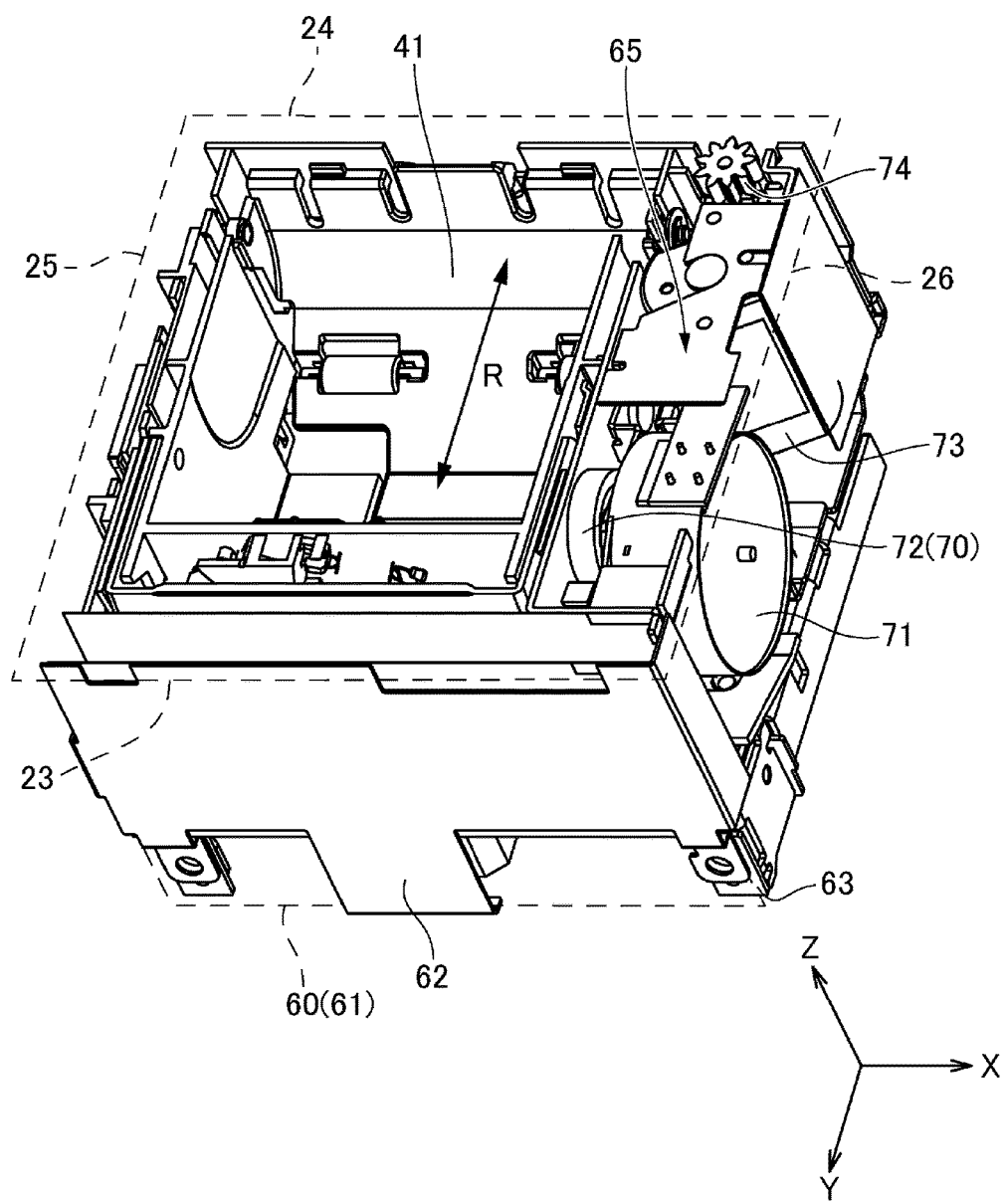
FIG. 5 is an oblique section view through a plane parallel to a first side showing the internal configuration with the printer case removed.

FIG. 5 is an oblique view of the internal configuration through a plane parallel to the first side 21 with the printer case 2 removed, and shows the internal configuration in the same first orientation 1A as in FIG. 1, FIG. 3, and FIG. 4. As shown in the figure, a sheet metal frame is disposed along the inside surfaces of the third side 23, fourth side 24, and sixth side 26 of the printer case 2, and the roll paper holder 41 is disposed in the space surrounded by this frame. The roll paper holder 41 is disposed so that the direction from the third side 23 to the fourth side 24 (the Y-axis in FIG. 5) is the direction in which the paper roll 12 turns in the roll paper holder 41. The roll paper printer 1 is placed so that the direction perpendicular to the direction of rotation R of the paper roll 12 (the X-axis in FIG. 5) is the width of the roll paper printer 1 as seen from the user.

The roll paper holder 41 is disposed on one side (−X-axis side, the side of the sixth side 26) of the width (the direction perpendicular to the direction of rotation R: the X-axis) inside the printer case 2. Between the roll paper holder 41 and the fifth side 25 is a drive mechanism space 65 where the drive mechanisms of the roll paper printer 1 are concentrated. The drive mechanism space 65 is the space between the roll paper holder 41 and fifth side 25 extending from the circuit board 60 on the third side 23 side to the back side of the fourth side 24.

The roll paper printer 1 has a conveyance mechanism 70 that conveys the recording paper 11, and a conveyance motor 71 that drives the conveyance mechanism 70. The conveyance mechanism 70 includes the platen roller 31 that conveys the recording paper 11, and a roller drive mechanism 72 such as a gear train that transfers drive power from the conveyance motor 71 to the platen roller 31. The conveyance motor 71 and part of the roller drive mechanism 72 are located inside the drive mechanism space 65 on the circuit board 60 side. The cutter mechanism 30 of the roll paper printer 1 includes a movable knife and a fixed knife disposed to the back side of the recording paper exit 3, a cutter motor 73 that drives the movable knife, and a movable knife drive mechanism 74 such as a gear train and cam that transfer drive power from the cutter motor 73 to the movable knife. The cutter motor 73 and part of the movable knife drive mechanism 74 are located inside the drive mechanism space 65 in the area near the fourth side 24.

Connector Housing Unit

Figure 6:
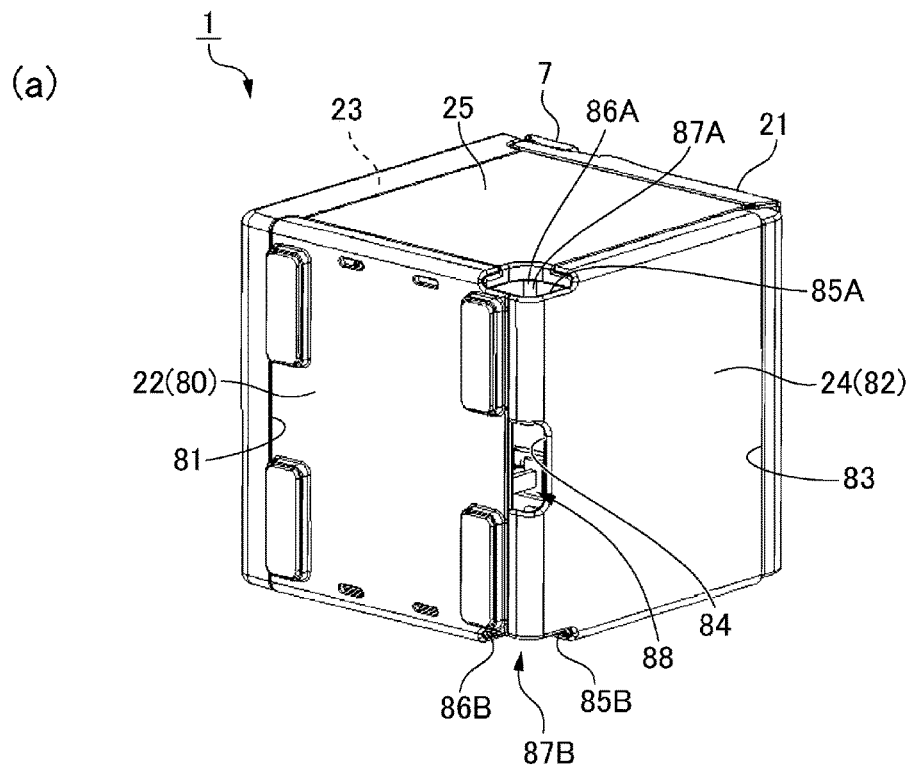
FIG. 6 is an oblique view of the roll paper printer showing the bottom and back sides, and an oblique view with the parts of the printer case forming the bottom and back sides removed.
Figure 6:
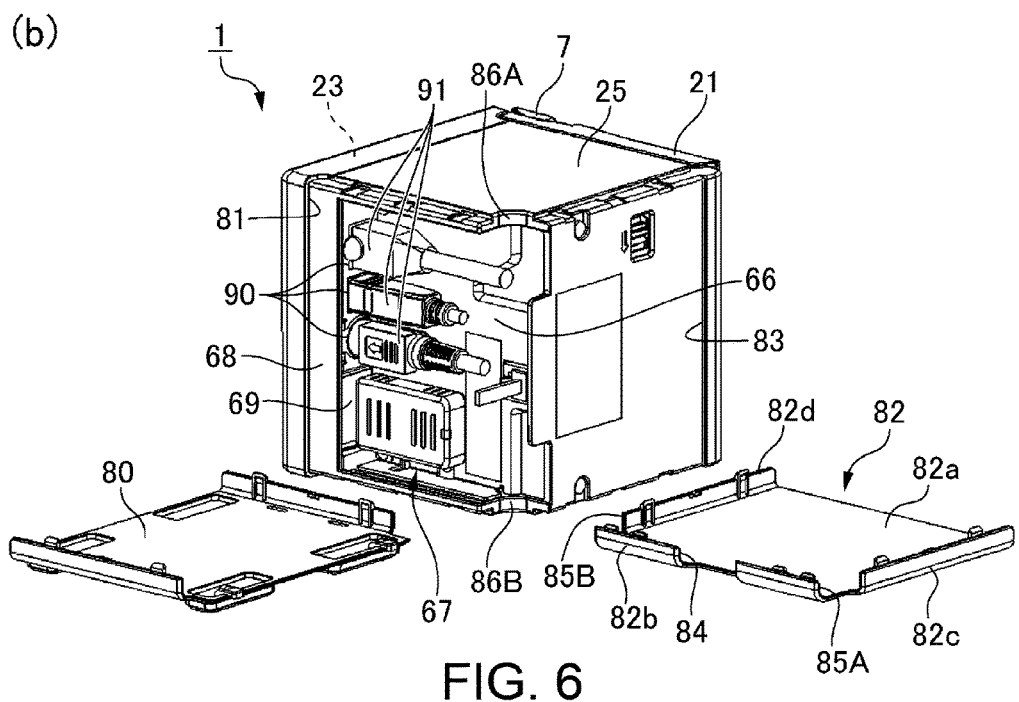

FIG. 6 (a) is an oblique view of the roll paper printer 1 as seen from the bottom and back sides, and FIG. 6 (b) is an oblique view with the parts forming the bottom and back of the printer case 2 removed. As shown in the figure, a first cover 80, and a first opening 81 that the first cover 80 covers, are formed on the second side 22 of the printer case 2. A second cover 82, and a second opening 83 that the second cover 82 covers, are formed on the fourth side 24 of the printer case 2. The second side 22 and the fourth side 24 are connected, and the first opening 81 and the second opening 83 are connected.

As shown in FIG. 3 and FIG. 4, the roll paper holder 41 described above, and a support frame 66 that supports the roll paper holder 41 and drive mechanism, are disposed on the inside side of the second side 22. The support frame 66 is located at a position removed a specific distance toward the first side 21 from the second side 22. When the first cover 80 is installed covering the first opening 81, a connector housing 67 is formed between the first cover 80 and the support frame 66. The connector housing 67 is a space between the first cover 80 and the support frame 66.

A device-side connector mount 68 is disposed at the corner between the second side 22 and third side 23. The device-side connector mount 68 has a connector mounting surface 69 facing the connector housing 67. The connector mounting surface 69 is a surface facing the fourth side 24, and multiple connectors 90 (device-side connectors) for connecting cables are exposed at this surface. In this example, connector 90 terminals for a power connection, a USB connection, and a LAN connection are exposed. These connectors 90 can connect to external connectors 91 attached to the cables that are connected to the external devices and power unit.

The second cover 82 has a rectangular flat panel 82a, a first edge portion 82b that rises from the edge of the flat panel 82a on the side connecting to the first cover 80, and a second edge portion 82c and a third edge portion 82d that rise from the two edges contiguous to the edge where the first edge portion 82b is formed. A notch 84 of a specific width is formed in the middle of the first edge portion 82b. Notches 85A and 85B contiguous to the first edge portion 82b are respectively formed in the second edge portion 82c and third edge portion 82d. When the first cover 80 is attached to the first opening 81, and the second cover 82 is attached to the second opening 83, the notch 85A in the second cover 82 connects to a notch 86A formed in the corner of the fifth side 25, forming a wiring hole 87A. Likewise, the notch 85B in the second cover 82 connects to a notch 86B formed in the corner of the sixth side 26, forming another wiring hole 87B. Another wiring hole 88 is formed between the middle notch 84 in the first edge portion 82b and the first cover 80. Wiring holes 87A, 87B, and 88 are holes that communicate with the connector housing 67. Therefore, the cables of the external connectors 91 connected to the connectors 90 of the connector mounting surface 69 inside the connector housing 67 can pass through the wiring holes 87A, 87B, and 88 to the outside.

Operating Effect

As described above, a roll paper printer 1 according to this embodiment has a NFC communication unit 10 for communicating by contactless near-field communication, and can be placed in a first orientation 1A in which the third side 23 (first surface) to which the NFC communication unit 10 is disposed is at the front, or a second orientation 1B in which the third side 23 is at the top. Therefore, whether in the first orientation 1A or the second orientation 1B, the NFC communication unit 10 is located at a position easily accessible to the user. There is no need to provide a second NFC communication unit 10, or a means of changing the location of the NFC communication unit 10, in order to assure ease of use. This is beneficial for achieving a small size. Furthermore, because the NFC communication unit 10 is disposed at a corner between the third side 23 (first surface) and first side 21 (second surface), in the location of the NFC communication unit 10 does not change substantially when the printer orientation is changed. Ease of use therefore does not change. Furthermore, locating the NFC communication unit 10 at the corner of the top and the front is convenient for near-field communication with a terminal held by the user.

In this embodiment of the invention the circuit board 60 comprising the controller 61 that controls parts of the roll paper printer 1 is disposed in the space between the printing mechanism including the printhead 32 and roll paper holder 41, and the third side 23 of the printer case 2. Space efficiency is therefore good and beneficial for a small device configuration. Furthermore, because the NFC communication unit 10 is near the circuit board 60, connecting the NFC communication unit 10 and circuit board 60 is simple.

The circuit board 60 is also covered by a water resistant sheet 64 from the recording paper exit 3 side in this embodiment, and a sheet metal panel 62 is disposed along the circuit board 60. Failure and faults in the control elements and circuits on the circuit board 60 due to contact with liquid entering from the recording paper exit 3 can therefore be prevented. Failure and faults in the control elements and circuits on the circuit board 60 due to static electricity can also be avoided.

The conveyance motor 71 and roller drive mechanism 72 of the conveyance mechanism 70, and the cutter motor 73 and movable knife drive mechanism 74 of the cutter mechanism 30, are also concentrated together in the same direction as the direction of rotation R of the paper roll 12 relative to the roll paper holder 41. Therefore, large drive components such as the conveyance motor 71 and cutter motor 73 can be concentrated in the space left after disposing the roll paper holder 41 in the printer case 2. An arrangement that uses space efficiently is therefore achieved, and the printing mechanism unit can be configured compactly. This is also beneficial for a small device size. More particularly, because the roll paper holder 41 is long in the direction of rotation R of the paper roll 12, a configuration with good space efficiency can be achieved when the roll paper printer 1 is basically shaped like a cube.

In this embodiment of the invention a connector housing 67 for holding the external connectors 91 is formed inside the second side 22 of the printer case 2, and a device-side connector mount 68 is disposed to the connector housing 67. As a result, all external connectors 91 connected to the device-side connectors 90 can be housed in the connector housing 67. Space for placing a connection unit for the connectors is not needed outside the printer case 2, and the appearance is better when installed. Problems resulting from accidentally touching connections between the external connectors 91 and device-side connectors 90 can also be avoided.

INDUSTRIAL APPLICABILITY

As described above, the invention is useful in a printing device that can be placed and used in multiple orientations, such as vertically and horizontally, and can be used in a printing device that can be used in different orientations without reducing user access to the operating unit.

REFERENCE SIGNS LIST 1 roll paper printer (printing device)
1A first orientation
1B second orientation
2 printer case
3 recording paper exit
4 roll paper loading opening
5 access cover
5A closed position
5B open position
6 front end part 7 operating lever
8 operating unit
9 display unit
10 NFC communication unit (contactless communication unit)
11 recording paper
12 paper roll
21 first side (second surface)
22 second side
23 third side (first surface)
24 fourth side
25 fifth side
26 sixth side
30 cutter mechanism
31 platen roller
32 printhead
33 platen support frame
34 access cover unit
34A closed position
34B open position
35 delivery roller
36 paper guide
37 paper detection lever
40 roll paper compartment
41 roll paper holder
60 circuit board
61 controller
62 sheet metal panel
63 frame
64 water resistant sheet (water resistant member)
65 drive mechanism space
66 support frame
67 connector housing
68 device-side connector mount
69 connector mounting surface
70 conveyance mechanism
71 conveyance motor
72 roller drive mechanism
73 cutter motor
74 movable knife drive mechanism
80 first cover
81 first opening
82 second cover
82a flat panel
82b first edge portion
82c second edge portion
82d third edge portion
83 second opening
84 notch
85A, 85B notch
86A, 86B notch
87A, 87B wiring hole
88 wiring hole
90 connectors (device-side connectors)
91 external connectors
R direction of rotation

The invention claimed is:

1. A printing device comprising:
a printhead that prints on recording paper;
a contactless communication unit that communicates by contactless near-field communication; and
a case that houses the printhead and the contactless communication unit;
the case having a first surface where the contactless communication unit is disposed, and a second surface that connects to the first surface and has a recording paper exit from which the recording paper is discharged;
the printing device being usable in a first orientation in which the second surface is the top, and a second orientation in which the second surface is the front,
wherein the recording paper exit is disposed at an edge of the second surface where the first surface and the second surface meet.

2. The printing device described in claim 1, wherein the contactless communication unit is disposed at a corner where the first surface and the second surface meet.

3. The printing device described in claim 2, wherein indication of the place where the contactless communication unit is located is provided on the first surface or the second surface.

4. The printing device described in claim 2, further comprising:
a circuit board configuring a control unit that controls the printhead based on information acquired by the contactless communication unit,
the circuit board being disposed along the first surface.

5. The printing device described in claim 4, further comprising:
a water resistant member covering the recording paper exit side of the circuit board.

6. The printing device described in claim 5, further comprising:
a sheet metal member is disposed along the circuit board,
the sheet metal member being separated by at least a specific distance from the contactless communication unit.

7. The printing device described in claim 6, further comprising either or both:
a display unit disposed at a corner where the first surface and the second surface meet; and
an access cover disposed to the first surface or the second surface.

8. The printing device described in claim 7, further comprising:
a conveyance mechanism that conveys the recording paper, and a conveyance motor that drives the conveyance mechanism;
a cutter mechanism that cuts the recording paper, and a cutter motor that drives the cutter mechanism; and
a roll paper holder in which a paper roll of the recording paper wound into a roll is held;
the conveyance motor and the cutter motor being disposed in a direction perpendicular to a direction of rotation in which the paper roll held in the roll paper holder rolls, and on the same side as a side on which the roll paper holder is disposed.

9. The printing device described in claim 8, further comprising:
a device-side connector to which can connect an external connector connected to an external cable;
the case having a connector housing that can house the external connector; and
the device-side connector being disposed facing the connector housing.

10. A printing device comprising:
a printhead that prints on recording paper;
a contactless communication unit that communicates by contactless near-field communication; and
a case that houses the printhead and the contactless communication unit;

the case having a first surface where the contactless communication unit is disposed, and a second surface that connects to the first surface and has a recording paper exit from which the recording paper is discharged;

the printing device being usable in a first orientation in which the second surface is the top, and a second orientation in which the second surface is the front, wherein the contactless communication unit is disposed at a corner where the first surface and the second surface meet.

11. The printing device described in claim 10, wherein indication of the place where the contactless communication unit is located is provided on the first surface or the second surface.

12. The printing device described in claim 10, further comprising:

a circuit board configuring a control unit that controls the printhead based on information acquired by the contactless communication unit, the circuit board being disposed along the first surface.

13. The printing device described in claim 12, further comprising:

a water resistant member covering the recording paper exit side of the circuit board.

14. The printing device described in claim 13, further comprising:

a sheet metal member is disposed along the circuit board, the sheet metal member being separated by at least a specific distance from the contactless communication unit.

15. The printing device described in claim 14, further comprising either or both:

a display unit disposed at a corner where the first surface and the second surface meet; and an access cover disposed to the first surface or the second surface.

16. The printing device described in claim 15, further comprising:

a conveyance mechanism that conveys the recording paper, and a conveyance motor that drives the conveyance mechanism;

a cutter mechanism that cuts the recording paper, and a cutter motor that drives the cutter mechanism; and a roll paper holder in which a paper roll of the recording paper wound into a roll is held;

the conveyance motor and the cutter motor being disposed in a direction perpendicular to a direction of rotation in which the paper roll held in the roll paper holder rolls, and on the same side of the roll paper holder.

17. The printing device described in claim 16, further comprising:

a device-side connector to which can connect an external connector connected to an external cable;

the case having a connector housing that can house the external connector; and the device-side connector being disposed facing the connector housing.

* * * * *